(12) United States Patent
Das et al.

(10) Patent No.: US 10,363,548 B2
(45) Date of Patent: Jul. 30, 2019

(54) ALUMINUM BASED METALLIC GLASS POWDER FOR EFFICIENT DEGRADATION OF AZO DYE AND OTHER TOXIC ORGANIC CHEMICALS

(71) Applicant: University of North Texas, Denton, TX (US)

(72) Inventors: Santanu Das, Denton, TX (US); Sundeep Mukherjee, Highland Village, TX (US)

(73) Assignee: UNIVERSITY OF NORTH TEXAS, Denton, TX (US)

(*) Notice: Subject to any disclaimer, the term of this patent is extended or adjusted under 35 U.S.C. 154(b) by 53 days.

(21) Appl. No.: 15/409,972

(22) Filed: Jan. 19, 2017

(65) Prior Publication Data
US 2017/0209853 A1    Jul. 27, 2017

Related U.S. Application Data
(60) Provisional application No. 62/281,942, filed on Jan. 22, 2016.

(51) Int. Cl.
*B01J 21/02* (2006.01)
*B01J 23/755* (2006.01)
(Continued)

(52) U.S. Cl.
CPC .............. *B01J 23/83* (2013.01); *B01J 21/02* (2013.01); *B01J 23/755* (2013.01); *B01J 35/004* (2013.01); *B01J 35/0006* (2013.01); *B01J 35/023* (2013.01); *B01J 35/08* (2013.01); *B01J 37/0081* (2013.01); *B01J 37/0221* (2013.01);
(Continued)

(58) Field of Classification Search
CPC . B01J 21/02; B01J 23/755; B01J 23/83; B01J 35/0006; B01J 35/004; B01J 35/023; B01J 35/08; B01J 37/0221; B22F 9/082; B22F 1/0003
See application file for complete search history.

(56) References Cited

U.S. PATENT DOCUMENTS 3,843,420 A * 10/1974 Gittleman et al. ...... C23C 14/08
148/100
4,056,411 A * 11/1977 Chen ...................... C22C 45/04
148/121
(Continued)

FOREIGN PATENT DOCUMENTS

| CN | 1415565 A | 5/2003 |
|---|---|---|
| CN | 103585998 A | 2/2014 |
| CN | 104174380 A | 12/2014 |

OTHER PUBLICATIONS

Wang, Jun-Qiang et al. "Rapid Degradation of Azo Dye by Fe-Based Metallic Glass Powder" Adv. Funct. Mater. 2012, 22, 2567-2570.
(Continued)

*Primary Examiner* — Cam N. Nguyen
(74) *Attorney, Agent, or Firm* — Edwin S. Flores; Daniel J. Chalker; Chalker Flores, LLP

(57) ABSTRACT

The present invention provides amorphous bi-functional catalytic aluminum metallic glass particles having an aluminum metallic glass core and 2 or more transition metals disposed on the surface of the aluminum metallic glass core to form amorphous bi-functional aluminum metallic glass particles with catalytic activity.

17 Claims, 4 Drawing Sheets

(51) Int. Cl.

| | | |
|---|---|---|
| *B01J 23/83* | (2006.01) | |
| *B01J 35/00* | (2006.01) | |
| *B01J 35/02* | (2006.01) | |
| *B01J 35/08* | (2006.01) | |
| *B01J 37/02* | (2006.01) | |
| *B22F 9/08* | (2006.01) | |
| *B22F 1/00* | (2006.01) | |
| *C22C 45/08* | (2006.01) | |
| *C22C 1/00* | (2006.01) | |
| *C02F 1/72* | (2006.01) | |
| *B22F 1/02* | (2006.01) | |
| *B01J 37/00* | (2006.01) | |
| *C22C 1/04* | (2006.01) | |
| *C02F 101/30* | (2006.01) | |
| *B01J 37/34* | (2006.01) | |

(52) U.S. Cl.
CPC .......... *B22F 1/0003* (2013.01); *B22F 1/025* (2013.01); *B22F 9/082* (2013.01); *C02F 1/725* (2013.01); *C22C 1/002* (2013.01); *C22C 1/0416* (2013.01); *C22C 45/08* (2013.01); *B01J 35/002* (2013.01); *B01J 35/008* (2013.01); *B01J 35/0033* (2013.01); *B01J 37/34* (2013.01); *B01J 2523/00* (2013.01); *B22F 2999/00* (2013.01); *C02F 2101/308* (2013.01)

(56) References Cited

U.S. PATENT DOCUMENTS

| | | | | |
|---|---|---|---|---|
| 4,187,128 | A * | 2/1980 | Billings | C22C 45/008 148/101 |
| 4,227,120 | A * | 10/1980 | Luborsky | H01J 65/048 148/108 |
| 4,965,139 | A * | 10/1990 | Kabacoff | C23C 14/16 148/403 |
| 6,535,096 | B1 * | 3/2003 | Rapoport | F02P 3/02 336/96 |
| 6,608,543 | B2 * | 8/2003 | Rapoport | F02P 3/02 336/90 |
| 9,149,673 | B2 | 10/2015 | Dongare et al. | |
| 2001/0001397 | A1 * | 5/2001 | Chiriac | H01F 1/15383 148/304 |
| 2001/0036084 | A1 * | 11/2001 | Yoshida | H01F 1/15308 363/13 |
| 2007/0258842 | A1 * | 11/2007 | Lu | C22C 33/0257 419/10 |

OTHER PUBLICATIONS

Wang, Jun-Qiang et al. "Excellent capability in degrading azo dyes by MgZn-based metallic glass powders" Sol. Rep., vol. 2, May 23/online 2012.

Zhao, Y. F. et al. "Synthesis of Mg—Zn—Ca metallic glasses by gas-atomization and their excellent capability in degrading azo dyes," Materials Science and Engineering: B, vol. 181, pp. 46-55, Feb. 2014.

* cited by examiner

ALUMINUM BASED METALLIC GLASS POWDER FOR EFFICIENT DEGRADATION OF AZO DYE AND OTHER TOXIC ORGANIC CHEMICALS

CROSS-REFERENCE TO RELATED APPLICATIONS

This application claims priority based on U.S. Provisional Application No. 62/281,941, filed Jan. 22, 2016. The contents of which is incorporated by reference in its entirety.

TECHNICAL FIELD OF THE INVENTION

The present invention relates generally to methods and compositions used for the removal of organic dye and organic pollutants from a solution, and more specifically to the degradation of AZO dyes and organic pollutants.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with the degradation of AZO dyes and organic pollutants. AZO dyes, generated from industrial waste, create an alarming threat as toxic water pollutant and carcinogen. A very recent study reported that AZO dyes decrease the permeability of blood-brain barrier, which may result in chronic neurological disorder in the human body. Transition metals (Fe, Ni) and noble metals (Pt, Pd) have been used to degrade and detoxify different organic water pollutants, including AZO dye. Noble metals typically show high catalytic activity. However, high cost, scarcity, and susceptibility to catalyst poisoning limit their application as water purifier. Thus, late transition metals like Fe, Ni, and Fe—Ni bi-metallic catalyst are attractive owing to their low cost, excellent catalytic performance, and easy availability in different forms. However, poor durability and high reactivity in aqueous medium restrict their potential use as a water purifier. In addition, these metals in elemental form exhibit wide range of toxicity in human body including cancer formation.

U.S. Pat. No. 9,149,673, entitled, "Removal of organic dyes and organic pollutants by titanium peroxide gel," discloses a one step process of removal of chromophore/dye/organic pollutant from a solution comprising a polymer free titanium oxide gel i.e. high zeta potential is disclosed. The concentration of the chromophores is removed up to 95-100%.

China Patent Application No. 1415565, entitled, "Method for treating waste water of azo dye," discloses a process for treating the sewage containing azo dye includes such steps as regulating pH value to less than 2.5, adding iron powder, stirring for decoloring, and radiating by ultraviolet light for optical degradation. Its advantages are high speed and effect, and no secondary pollution.

China Patent Application No. 104174380, entitled, "Green environment-friendly degradable adsorption material for azo dye industrial wastewater," discloses a green environment-friendly degradable adsorption material for azo dye industrial wastewater is characterized by comprising the following substances in parts by weight: 10-32 parts of acrylic high-molecular water-absorption material, 3-9 parts of phosphoric acid, 5-14 parts of concentrated hydrochloric acid, 14-26 parts of ethanol, 5-16 parts of ammonia water, 3-6 parts of gallic acid, 2-6 parts of citric acid, 1-6 parts of diatomite, 3-8 parts of perforated expanded perlite, and 4-11 parts of a phosphite anti-oxidant. The beneficial effects comprise that the green environment-friendly degradable adsorption material is high in adsorption property, is capable of adsorbing azo dye molecules in azo dye wastewater into a tiny network to reach the effect of efficiently absorbing azo dye molecules in wastewater, and is good in processing effect; and also dye wastes subjected to adsorption can be used as a pigment of plastic and building materials.

China Patent Application No. 103585998, entitled, "Material for treating azo dye industrial wastewater," discloses a material for treating azo dye industrial wastewater, which is characterized by comprising the following components in parts by weight: 10-32 parts of acrylic acid high-polymer water-absorbing resin, 10-25 parts of bagasse, 1-2 parts of nano calcium sulfate, 2-7 parts of titanate coupling agent, 0.1-0.3 part of nano silver, 1-2 parts of maleic anhydride graft polypropylene, 2-3 parts of polyethylene terephthalate, 10-16 parts of cement ash water solution, 9-15 parts of ferric oxide, 1-3 parts of high-density polyethylene (HDPE), 3-4 parts of toughener EOC and 1-3 parts of stearic acid. The material has high absorptivity, can adsorb azo dye molecules in azo dye wastewater into small networks, achieves the effect of efficiently absorbing azo dye molecules in wastewater, and has favorable treatment effect. The dye waste after adsorption can be used as a pigment for plastics and building materials.

SUMMARY OF THE INVENTION

The present invention provides amorphous bi-functional catalytic aluminum metallic glass particles comprising an aluminum metallic glass core and 2 or more transition metals disposed on the surface of the aluminum metallic glass core to form amorphous bi-functional aluminum metallic glass particles with catalytic activity. The amorphous bi-functional aluminum metallic glass particle surface has a low concentration of the 2 or more transition metals. The amorphous bi-functional aluminum metallic glass particles react to degrade azo compounds and/or reacts with azo groups. The 2 or more transition metals may be Y, Ni and Fe. The 2 or more transition metals may be Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Ununnilium, Unununium, and Ununbium. The aluminum may be at least 80% of the composition. The aluminum may be at least 80%, Y comprises at least 5%, Ni comprises at least 4% and Fe comprises at least 1% of the composition. The aluminum may be 77-87%, Y comprises 5-11%, Ni comprises 4-10% and Fe comprises 1-5% of the composition. The aluminum may be about 82%, Y comprises about 8%, Ni comprises about 7% and Fe comprises about 3% of the composition. The amorphous bi-functional aluminum metallic glass particles may be $Al_{82}Y_8Ni_7Fe_3$. The composition of claim 1, wherein the amorphous bi-functional aluminum metallic glass particles may have a diameter of greater than 500 nm. The amorphous bi-functional aluminum metallic glass particles have a diameter of 0.5-40 µm. The azo compounds may be Orange II ($C_{16}H_{11}N_2NaO_4S$), Chrysoidine ($C_{12}H_{13}ClN_4$), Tropaeolin O ($C_{12}H_9N_2NaO_5S$), Acid Orange, and Acid Red.

The present invention provides a method of making an amorphous bi-functional metallic glass powder for catalytic activity comprising the steps of: heating an metal composition to a molten metal, wherein the metal composition comprises aluminum, yttrium, nickel, and iron; contacting the molten metal with a high pressure gas jet to atomize the molten metal to form amorphous bi-functional aluminum metallic glass particles with catalytic activity; and collecting the amorphous bi-functional aluminum metallic glass particles. The amorphous bi-functional aluminum metallic glass particle surface has a low concentration of the 2 or more transition metals. The amorphous bi-functional aluminum metallic glass particles react to degrade azo compounds and/or reacts with azo groups. The 2 or more transition metals may be Y, Ni and Fe. The 2 or more transition metals may be Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Ununnilium, Unununium, and Ununbium. The aluminum may be at least 80% of the composition. The aluminum may be at least 80%, Y comprises at least 5%, Ni comprises at least 4% and Fe comprises at least 1% of the composition. The aluminum may be 77-87%, Y comprises 5-11%, Ni comprises 4-10% and Fe comprises 1-5% of the composition. The aluminum may be about 82%, Y comprises about 8%, Ni comprises about 7% and Fe comprises about 3% of the composition. The amorphous bi-functional aluminum metallic glass particles may be $Al_{82}Y_8Ni_7Fe_3$. The composition of claim 1, wherein the amorphous bi-functional aluminum metallic glass particles may have a diameter of greater than 500 nm. The amorphous bi-functional aluminum metallic glass particles have a diameter of 0.5-40 µm. The azo compounds may be Orange II ($C_{16}H_{11}N_2NaO_4S$), Chrysoidine ($C_{12}H_{13}ClN_4$), Tropaeolin O ($C_{12}H_9N_2NaO_5S$), Acid Orange, and Acid Red.

The present invention provides an amorphous bi-functional aluminum metallic glass catalyst comprising: an aluminum metallic glass core; and 2 or more transition metals disposed on the surface of the aluminum metallic glass core to form amorphous bi-functional aluminum metallic glass particles with catalytic activity. The amorphous bi-functional aluminum metallic glass particle surface has a low concentration of the 2 or more transition metals. The amorphous bi-functional aluminum metallic glass particles react to degrade azo compounds and/or reacts with azo groups. The 2 or more transition metals may be Y, Ni and Fe. The 2 or more transition metals may be Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Ununnilium, Unununium, and Ununbium. The aluminum may be at least 80% of the composition. The aluminum may be at least 80%, Y comprises at least 5%, Ni comprises at least 4% and Fe comprises at least 1% of the composition. The aluminum may be 77-87%, Y comprises 5-11%, Ni comprises 4-10% and Fe comprises 1-5% of the composition. The aluminum may be about 82%, Y comprises about 8%, Ni comprises about 7% and Fe comprises about 3% of the composition. The amorphous bi-functional aluminum metallic glass particles may be $Al_{82}Y_8Ni_7Fe_3$. The composition of claim 1, wherein the amorphous bi-functional aluminum metallic glass particles may have a diameter of greater than 500 nm. The amorphous bi-functional aluminum metallic glass particles have a diameter of 0.5-40 µm. The azo compounds may be Orange II ($C_{16}H_{11}N_2NaO_4S$), Chrysoidine ($C_{12}H_{13}ClN_4$), Tropaeolin O ($C_{12}H_9N_2NaO_5S$), Acid Orange, and Acid Red.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figures 1A, 1B, 1C, 1D:
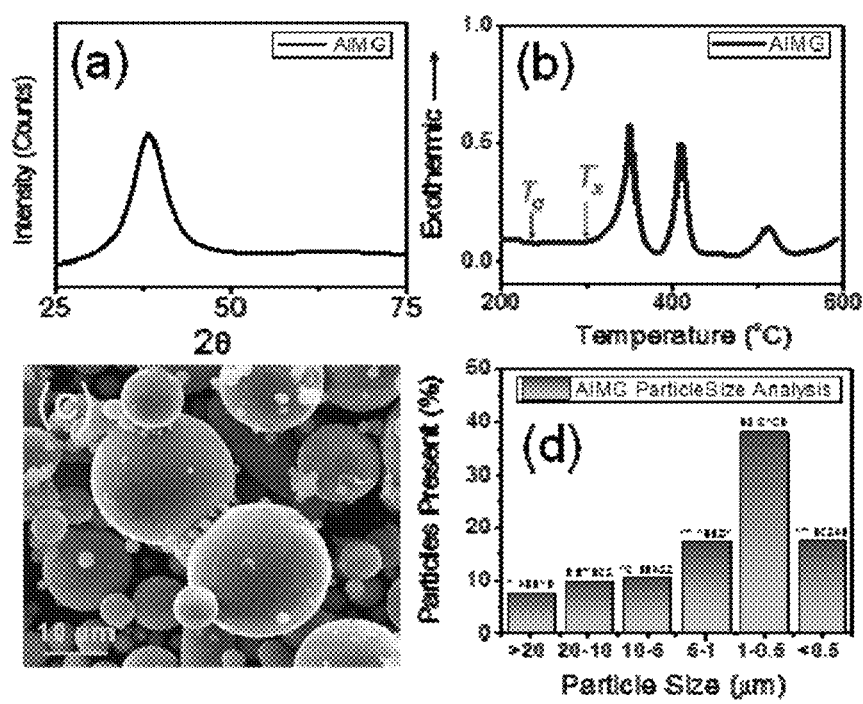
FIG. 1a shows an X-ray diffraction analysis showing the amorphous nature of the Aluminum metallic glass (AlMG) particles.
FIG. 1b shows a differential scanning calorimetry (DSC) which illustrates the sharp glass transition ($T_g$) and crystallization temperature ($T_x$).
FIG. 1c shows a scanning electron micrograph (SEM) image of AlMG particles which demonstrates the particles size in the range between 0.5 µm to 20 µm.
FIG. 1d shows the particle size analysis distribution of the particles, where significant percentages of the particles are in the size range of 0.5 µm to 5 µm.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

In aqueous medium, zero-valent transition metal ions (ZVTMI) (e.g. Fe) produce toxic reaction by-products such as rust ($Fe_2O_3 \cdot nH_2O$). Recently, Fe-based and Mg-based metallic glasses have been found to be very effective in degradation of organic chemicals including AZO dye. Metallic glasses (MG) are amorphous multi-component alloys that have attracted lot of interest due to their high catalytic activity, chemical inertness, and durability. The higher catalytic activity of the zero-valent amorphous alloys compared to their corresponding crystalline counterpart is attributed to their lower activation energy for electron transfer and uniform dispersion of the catalytically active components in a chemically homogeneous environment. In addition, large number of low-coordination atoms and defect sites promote catalytic reactions in amorphous systems. Uniform and random distribution of atoms in metallic glasses allows continuous control of their electronic and catalytic properties along with homogeneous surface reactivity. Recently, it has been found that addition of Ni to Fe facilitates electron transport and enhances bimetallic catalytic activity.

The present invention provides a small percentage of transition metal (Fe—Ni) constituents in a mostly aluminium alloy having extraordinarily high catalytic activity, with no toxic by-product and no change in surface characteristics. The amorphous nature of the alloy renders it inert and durable during the reaction, while promoting high surface catalytic activity at the same time. The advantages of this type of configuration include (i) a small percentage of transition metals are catalytically effective without any toxic by-products; (ii) aluminium is itself non-catalytic, however, its high electrical conductivity promotes fast charge transfer for the catalytic reaction; and (iii) light-weight Al-alloy particles are easily dispersed in any solution, thus, accelerating the homogeneous redox reactions. In addition, the effect of structure (amorphous versus crystalline) as well as the ionization state of the surface catalyst species on the reaction rate is demonstrated. Although there are several reports on AZO dye dissociation using metallic glasses, however, lack of dye degradation mechanism limits understanding in this field including further development. By combining Raman, Infrared (IR) spectroscopy, and X-ray photoelectron spectroscopy (XPS), the dye dissociation mechanism is shown and demonstrate the bi-functional (simultaneous change in ionization states of Ni and Fe) catalytic activities of metal at this amorphous alloy surface.

Differential Scanning Calorimetry (DSC). The glass transition temperature ($T_g$) and the crystallization temperature ($T_x$) for the AlMG powder were measured using a differential scanning calorimeter (DSC) (NETZSCH STA 449 F3). About 5 mg of the sample was placed in an alumina crucible and was heated from 473K to 873K in inert (Ar) atmosphere. The rate of heating was kept at 20 K/min during this calorimetric measurement.

X-ray Diffraction (XRD). The phase formed in as-received AlMG particles were identified using an X-ray diffractometer (Rigaku Ultima) with the samples exposed to Cu Kα radiation of wavelength of 1.54 Å. For X-ray diffraction measurement, all the samples were placed on the clay, which was mounted on a glass slide.

Scanning Electron Microscopy (SEM). The microstructure of the AlMG particles was observed using scanning electron microscope (FEI ESEM). All micrographs were captured at a voltage of 15 KV with a working distance of ~5 mm. The powdery samples were dispersed in a liquid medium followed by drop casting onto a Si substrate in order to image using the SEM.

UV-Visible Spectroscopy. Commercially available AZO Dye ($C_{32}H_{20}N_6Na_4O_{14}S_4$) was purchased from Sigma-Aldrich and 0.015 molar dye solution was prepared after mixing the equivalent amount of powder with deionized water.

The AlMG particles were dispersed in dye solution followed by sonication for 5-7 minutes. The absorption spectra of the solution were measured using UV Visible spectroscopy. The instrument was calibrated and the measurement baseline was corrected using deionized water before each measurement.

Raman and IR Spectroscopy. After the reaction, all the metal particles were extracted from solution and dried overnight under ambient atmospheric condition for the further characterization by Raman and IR spectroscopy.

Raman Spectroscopy. Raman spectroscopy was carried out for all the AlMG samples at room temperature from the frequency 0 to 4500. The Raman spectrometer (Enwave Optronics Inc., Pro Raman-L) used for these experiments is inbuilt with green Ar laser with wavelength 532 nm.

Infrared Spectroscopy. The Infra-red (IR) spectroscopy was obtained using an IR spectrophotometer (PerkinElmer Spectrum FT-IR Spectrophotometer) equipped with both transmission and ATR modes. The IR Spectrometer was used for data collection over a wave number range of 370-7800 $cm^{-1}$ using a fast recovery deuterated triglycine sulfate detector with KBr splitting. All the data collected using IR spectrophotometer was quantitatively analyzed using Spectrum One software.

X-ray photoelectron spectroscopy (XPS). X-ray photoelectron spectroscopy (XPS) was carried out using a PHI 5000 Versaprobe x-ray photoelectron spectrometer. The XPS instrument was equipped with a high-flux x-ray source, which provides a highly focused monochromatic x-ray beam that can be used to scan the sample surface. Similarly, the spectroscopic data was recorded in an XPS system which incorporates a high-resolution 180° spherical capacitor energy analyzer, which provides full-featured XPS analysis. A 100-5 kV differentially pumped argon ion gun was used with a regulated leak valve for specimen cleaning by sputtering with mono-layer atomic resolution.

FIG. 1a shows an X-ray diffraction analysis showing the amorphous nature of the Aluminium metallic glass (AlMG) particles. FIG. 1b shows a differential scanning calorimetry (DSC) illustrates the sharp glass transition ($T_g$) and crystallization temperature ($T_x$). Aluminium (Al) metallic glass (AlMG) powder of composition Al (82%) Y (8%) Ni (7%) Fe (3%) was synthesized by arc-melting the constituent elements followed by the gas-atomization process. The structure of synthesized metallic glass powder was investigated by X-ray diffraction (XRD) and differential scanning calorimetry (DSC) as shown in FIGS. 1a and b respectively. A broad hump without any crystalline peaks depicts the fully amorphous nature of the particles (FIG. 1a). FIG. 1b shows the DSC curve with a glass transition temperature ($T_g$) of 232° C., primary crystallization temperature ($T_{x1}$) of 304° C., and secondary crystallization temperature ($T_{x2}$) of 384° C. A wide super-cooled region of $\Delta T$ ($=T_{x1}-T_g$)~72° C. indicates good thermal stability of this powder. FIG. 1c shows a scanning electron micrograph (SEM) image of AlMG particles demonstrates the particles size in the range between 0.5 μm to 20 μm. Scanning electron micro-graph (SEM) is shown in the FIG. 1c, which demonstrate the smooth and spherical nature of the particles. FIG. 1d shows the particle size analysis distribution of the particles, where a significant percentage of the particles are in the size range of 0.5 μm to 5 μm. FIG. 1d shows the histogram of particle sizes, a significant percentage of particles being in the size range of 0.5-5 μm.

Figures 2A, 2B, 2C:
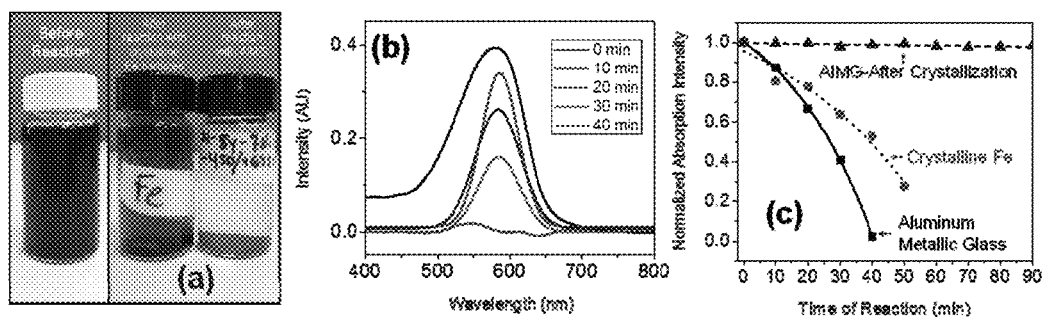
FIG. 2a is an image showing the color change of AZO dye (left picture) from deep blue to transparent (right picture) after reaction with Al-BMG. The middle picture shows the AZO dye after reaction with state-of-the-art zero valent iron powder and the brownish solution clearly demonstrates that Fe produces reaction by-product and unable to dissociate the dye completely.
FIG. 2b shows a UV-Visible absorption spectrum demonstrates that the solution became completely transparent after reacting with AlMG particles.
FIG. 2c shows a normalized intensity versus time plot illustrates that amorphous AlMG particles are faster in degrading AZO dye compared to their crystalline counterpart as well as current state-of-the-art zero valent iron powder.

FIG. 2a is an image showing the color change of AZO dye (left picture) from deep blue to transparent (right picture) after reaction with Al-BMG. The middle picture shows the AZO dye after reaction with state-of-the-art zero valent iron powder and the brownish solution clearly demonstrates that Fe produces reaction by-product and unable to dissociate the dye completely. AZO dye degradation tests were performed in a UV-VISIBLE spectrometer at room temperature. The absorption peaks of the dye solution were characterized before and after reaction with AlMG. Sonication was carried out during each experiment in order to disperse the particles in solution to initiate a homogeneous reaction with the dye molecules. As shown in FIG. 2a, the dark blue AZO dye solution became colorless after the reaction. UV-VIS data was collected as a function of time, where the absorption peak intensity diminished as the dye molecules continually degraded and the solution turned clear. FIG. 2b shows a UV-Visible absorption spectrum demonstrates that the solution became completely transparent after reacting with AlMG particles. AlMG powder degrades the AZO dye in less than 40 minutes, whereas state-of-the-art zero valent iron particles in the same size range took more than 60 minutes for the reaction. Even after 60 minutes the Fe powder was unable to degrade the dye completely and there were reaction by-products as shown in FIG. 2a (the middle picture shows that the solution is reddish brown and is not clear). After the reaction, both the AlMG and the pure Fe powder were extracted and dried overnight in ambient condition. There was no color change in AlMG particles after the reaction, whereas a clear color change was observed for the crystalline Fe particles from gray to yellowish brown. FIG. 2c shows a normalized intensity versus time plot illustrates that amorphous AlMG particles are faster in degrading AZO dye compared to their crystalline counterpart as well as current state-of-the-art zero valent iron powder. To obtain the rate of degradation reaction we normalized the intensity with the initial AZO dye absorption intensity. The slopes of the curves demonstrate the reaction rate, which is faster for AlMG compared to zero valent iron particles of the same size range. The amorphous AlMG particles were crystallized by going above the crystallization temperature in DSC and performed the same reaction with AZO dye solution followed by UV-VIS absorption tests. The normalized intensity plot shows (FIG. 2c) a flat line for crystalline AlMG samples depicting no change in the color of AZO dye. Thus, the surface catalytic activity is high for the amorphous particles but not for the corresponding crystallized ones. This is likely due to the formation of complex intermetallic phases with no catalytic activity.

Figures 3A, 3B, 3C, 3D:
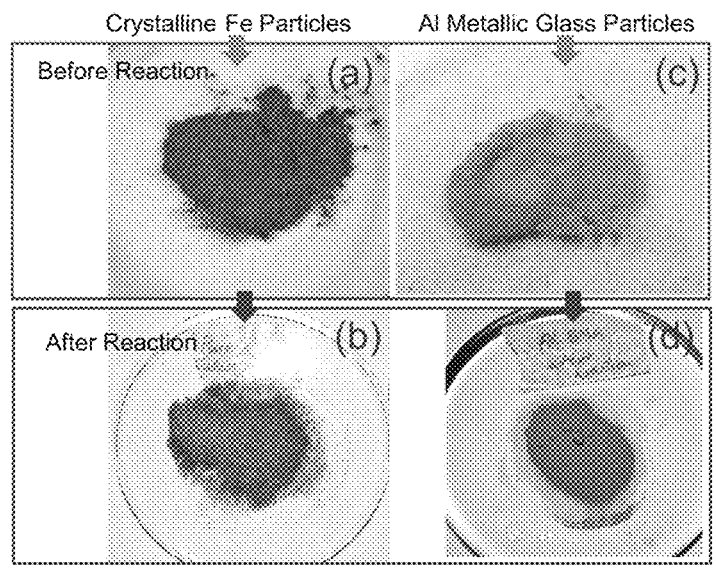
FIGS. 3a and 3b show the state-of-the-art zero valent iron powder before and after the reaction, to AZO dye, respectively.
FIGS. 3c and 3d show AlMG particles before and after the reaction, respectively.
Figures 4A, 4B, 4C, 4D:
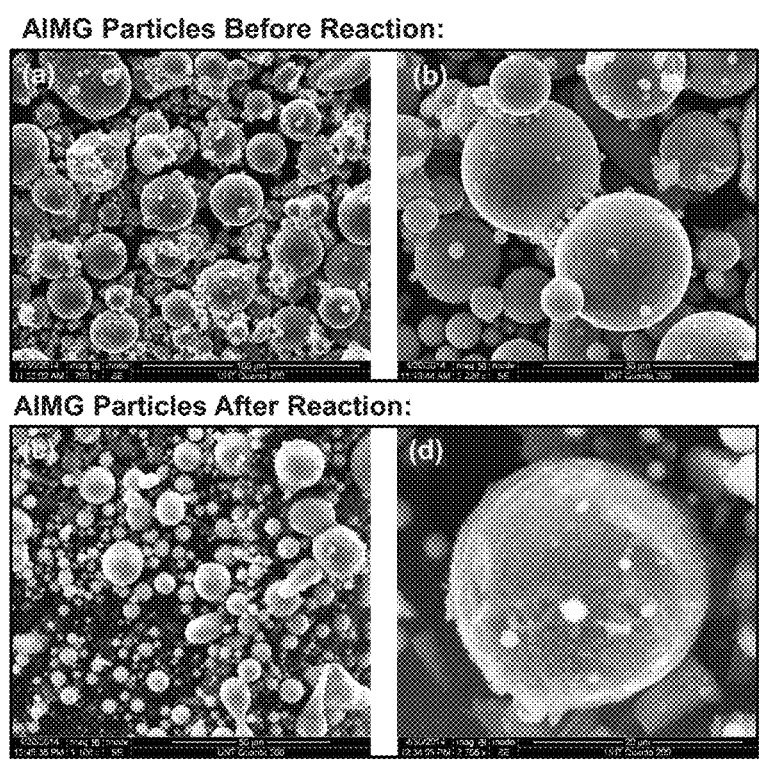
FIGS. 4a and 4b show scanning electron micrograph (SEM) of AlMG particles showing the surface properties before reaction.
FIGS. 4c and 4d show scanning electron micrograph (SEM) of AlMG particles showing the surface properties after reaction.

FIGS. 3a and 3b show the state-of-the-art zero valent iron powder before and after the reaction, to AZO dye, respectively. FIGS. 3c and 3d show AlMG particles before and after the reaction, respectively. The change in color of Fe particles is attributed to the formation of harmful by-products of iron oxides/hydroxides as reported earlier. In contrast, there was no color change for AlMG particles, confirming the excellent durability of the amorphous particles. Furthermore, we investigated the morphological stability of AlMG particles before and after the reaction and no changes were observed on the particle surface after 40 minute reaction as shown in FIGS. 4a-4d. FIGS. 4a and 4b show scanning electron micrograph (SEM) of AlMG particles showing the surface properties before reaction. FIGS. 4c and 4d show scanning electron micrograph (SEM) of AlMG particles showing the surface properties after reaction.

Figures 5A, 5B, 5C:
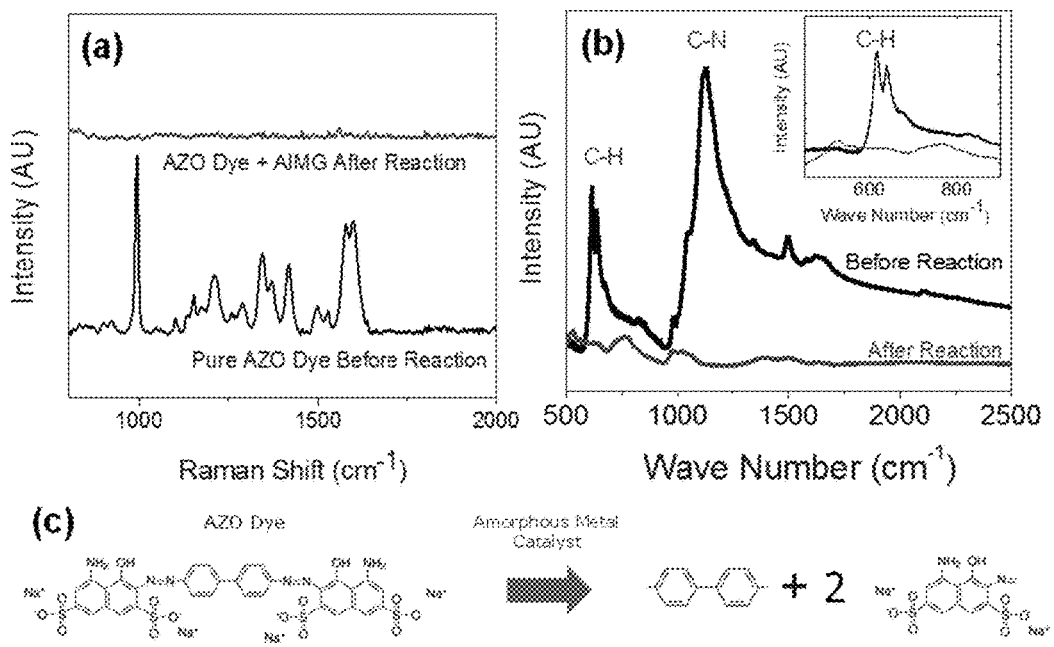
FIG. 5a shows a Raman spectrum of pure AZO dye before reaction and after reaction with AlMG particles showing complete dissociation of AZO dye.
FIG. 5b shows an infrared spectrum demonstrating the complete breaking of —C—H— and —C—N— bonds of AZO dye.
FIG. 5c shows an equation illustrating the catalyzing reaction of metallic glass for AZO dye degradation.

FIG. 5a shows a Raman spectrum of pure AZO dye before reaction and after reaction with AlMG particles showing complete dissociation of AZO dye. FIG. 5b shows an infrared spectrum demonstrating the complete breaking of —C—H— and —C—N— bonds of AZO dye. FIG. 5c shows an equation illustrating the catalyzing reaction of metallic glass for AZO dye degradation. FIGS. 5a and 5b show the comparative plots of Raman and infra-red (IR) spectroscopy respectively, of the pure AZO dye and the particles after the reactions. In Raman and IR, it was observed that the characteristic —C—H—, —C—N—, and —N═N— bond peaks of AZO dye are absent after the reaction. The absence of these bonds justifies that degradation of AZO dye takes place via surface activated redox reaction as shown in FIG. 5c.

Figures 6A, 6B:
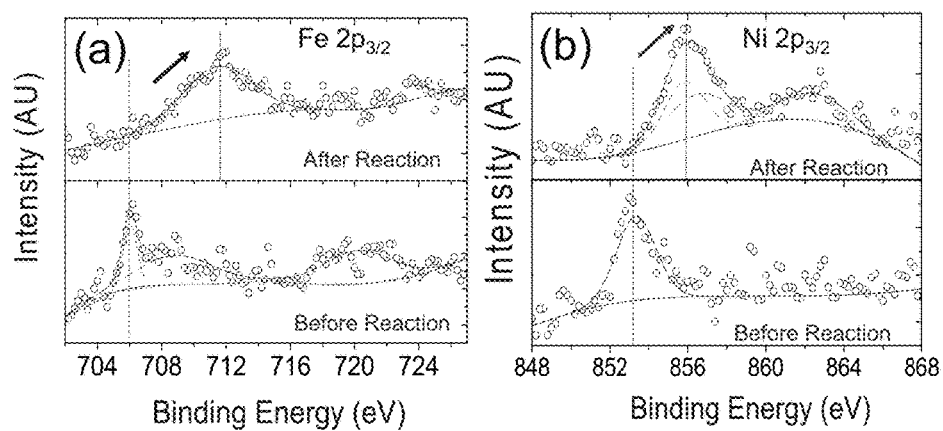
FIGS. 6a and 6b show X-ray photoelectron spectrum of (FIG. 6a) Fe $2p_{3/2}$ and (FIG. 6b) Ni $2p_{3/2}$ obtained from AlMG particles before and after reaction, respectively.

FIGS. 6a and 6b show X-ray photoelectron spectrum of (a) Fe $2p_{3/2}$ and (b) Ni $2p_{3/2}$ obtained from AlMG particles before and after reaction, respectively. X-ray photoelectron spectroscopy (XPS) was performed to further elucidate the mechanism of surface redox reaction as shown in FIGS. 6a and 6b.

Figures 7A, 7B, 7C, 7D:
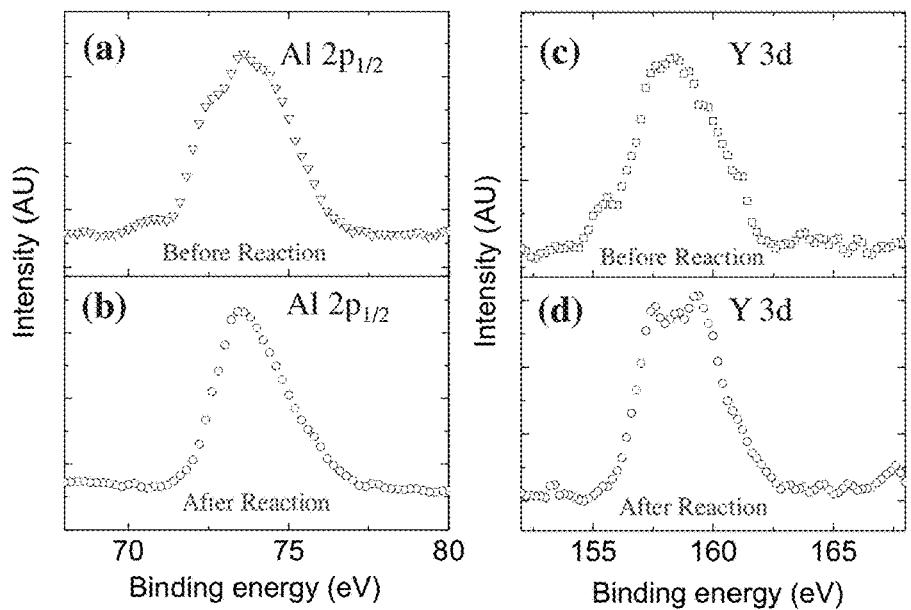
FIG. 7a shows an X-ray photoelectron spectrum of AlMG particle surface showing the Aluminum 2p1/2 peaks before reaction and FIG. 7b after reaction to the AZO dye.
FIG. 7c shows an X-ray photoelectron spectrum of AlMG particle surface showing the Yttrium 3d peaks before the reaction and FIG. 7d after reaction to the AZO dye.

FIG. 7a shows an X-ray photoelectron spectrum of AlMG particle surface showing the Aluminum 2p1/2 peaks before reaction and FIG. 7b after reaction to the AZO dye. FIG. 7c shows an X-ray photoelectron spectrum of AlMG particle surface showing the Yttrium 3d peaks before the reaction and FIG. 7d after reaction to the AZO dye. The surface composition of the AlMG particles were analyzed before and after reaction and no change in surface composition were found for each of the constituents. FIG. 7 shows the comparative X-ray photoelectron spectroscopy (XPS) peak positions of Al $2p_{1/2}$ and Y $3_{3/2}$ respectively, and no significant changes are found for Al and Y peaks before and after the reaction. Al is non-catalytic and does not undergo any change in its ionization state. However, the high percentage of aluminum in the alloy likely promotes rapid charge transfer due to its high electrical conductivity. Yttrium (Y) is a rare-earth transition metal, which promotes glass formation in this alloy system, but does not seem to participate in the catalytic redox reaction. The XPS peak positions and shape of Fe $2p_{3/2}$ for the catalyst-particles before and after reaction were noted as shown in FIG. 4a. The position of Fe $2p_{3/2}$ peak was at ~706 eV before reaction and shifted towards higher binding energy of 711.8 eV after reacting with AZO dye molecules. This peak shift is a clear representation of the change towards higher ionization state of Fe during the redox reaction. Similarly, peak shift towards higher binding energy for Ni justifies the change of its ionization state after reaction as shown in the FIG. 4b.

Figure 8A:
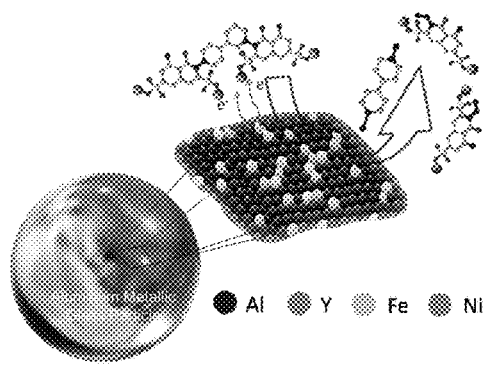
FIG. 8a shows an illustration of the bi-functional mechanism of AZO dye degradation using metallic glass particles.
Figure 8B:
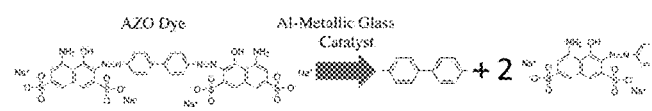
FIG. 8b illustrates the chemical reaction occurring as a catalytic degradation of the AZO dye.

FIG. 8a shows the schematic of the mechanism of the dissociation of AZO Dye. FIG. 8b shows the chemical reaction occurring as a catalytic degradation of the AZO dye. After fitting and the de-convolution of peaks, both Fe and Ni atoms were found on the surface of the metallic glass particles move towards higher binding energy state during the catalytic redox reaction. This simultaneous change in ionization state of the transition metal constituents likely contributes to the high catalytic activity of AlMG. In the process, the transition metals donate electrons to the redox reaction for AZO dye dissociation as illustrated in FIGS. 8a and 8b. Bimetallic transition metal catalysts boost the kinetics of redox reactions by enhancing the charge transfer twofold over any single-metal catalyst. At the same time, the amorphous structure promotes high durability without the formation of any toxic by-products.

The bi-functional catalysis mechanism of amorphous metals in degrading AZO Dye is successfully demonstrated. A small amount of transition metals together with highly conducting aluminum in an amorphous configuration promotes catalytically active surface-mediated redox process without any harmful byproduct formation. The amorphous powder is found to be superior compared to state-of-the-art zero valent iron powder with particles in the same size range. The simultaneous change in ionization state of the transition metal constituents contributes to the high catalytic activity of the metallic glass and opens up a new paradigm for designing new (bi-functional) catalysts. In addition, this bi-functional catalysis mechanism of amorphous metals can be further explored in efficient degradation of variety of other organic water pollutants, e.g. Acid orange IV, Orange I, Acid orange II, Acid red 3B, Acid orange GG, and several others.

Aluminum based metallic glass (AlMG) powder of composition $Al_{82}Y_8Ni_7Fe_3$ was found to be an efficient catalyst for the degradation of toxic organic chemicals, including, AZO dye ($C_{32}H_{20}N_6Na_4O_{14}S_4$), which is a carcinogen and toxic water pollutant. AlMG powder was synthesized by gas atomization and the particle size was found to be in the range of 10-40 μm. The reaction of AlMG with AZO dye solution results in complete dissociation in less than 40 minutes. In addition, no harmful toxic byproducts are generated from the reaction, making it an environmentally friendly process. Thus, this novel material provides rapid degradation of organic environmental pollutants.

Variation in the composition may affect the following properties of the catalyst powder: amorphous structure; catalytic charge transfer; AZO dye degradation rate; bi-to-tri metallic catalytic system; corrosion resistance; mechanical properties; dissociation of many other types of organic water pollutants; and reuse the particles multiple times and reduce waste.

The present invention provides a more efficient technology that the existing technology; degrades the organic chemicals faster than existing methods; degrades organic chemicals at room temperature; doesn't require any stringent conditions for the reaction; is nonhazardous; doesn't produce any harmful byproducts after the reaction; exhibits higher durability; and reduces the cost for waste management and handling.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

J.-Q. Wang, Y.-H. Liu, M.-W. Chen, G.-Q. Xie, D. V. Louzguine-Luzgin, A. Inoue, et al., "Rapid Degradation of Azo Dye by Fe-Based Metallic Glass Powder," *Advanced Functional Materials*, vol. 22, pp. 2567-2570, 2012.

J.-Q. Wang, Y.-H. Liu, M.-W. Chen, D. V. Louzguine-Luzgin, A. Inoue, and J. H. Perepezko, "Excellent capability in degrading azo dyes by MgZn-based metallic glass powders," *Sci. Rep.*, vol. 2, 05/23/online 2012.

Y. F. Zhao, J. J. Si, J. G. Song, Q. Yang, and X. D. Hui, "Synthesis of Mg—Zn—Ca metallic glasses by gas-atomization and their excellent capability in degrading azo dyes," *Materials Science and Engineering: B*, vol. 181, pp. 46-55, 2// 2014.

What is claimed is:

1. Amorphous bi-functional catalytic aluminum metallic glass particles comprising:
    an aluminum metallic glass core; and
    2 or more transition metals disposed on the surface of the aluminum metallic glass core to form amorphous bi-functional aluminum metallic glass particles with catalytic activity, wherein the aluminum comprises 77% or more of the composition.

2. The particles of claim 1, wherein an amorphous bi-functional aluminum metallic glass particle surface has a concentration of the 2 or more transition metals is between 13 to 23% of the particle.

3. The particles of claim 1, wherein the amorphous bi-functional aluminum metallic glass particles reacts to degrade one or more azo compounds.

4. The particles of claim 3, wherein the azo compounds are selected from the group consisting of Orange II ($C_{16}H_{11}N_2NaO_4S$), Chrysoidine ($C_{12}H_{13}ClN_4$), Tropaeolin O ($C_{12}H_9N_2NaO_5S$), Acid Orange, and Acid Red.

5. The particles of claim 1, wherein the 2 or more transition metals are Ni and Fe.

6. The particles of claim 1, wherein the 2 or more transition metals are Y, Ni and Fe.

7. The particles of claim 1, wherein the 2 or more transition metals are selected from the group consisting of Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, Ununnilium, Unununium, and Ununbium.

8. The particles of claim 1, wherein the aluminum comprises at least 80% of the composition.

9. The particles of claim 1, wherein the aluminum comprises at least 80%, Y comprises at least 5%, Ni comprises at least 4% and Fe comprises at least 1% of the particle.

10. The particles of claim 1, wherein the aluminum comprises 77-87%, Y comprises 5-11%, Ni comprises 4-10% and Fe comprises 1-5% of the particle.

11. The particles of claim 1, wherein the aluminum comprises about 82%, Y comprises about 8%, Ni comprises about 7% and Fe comprises about 3% of the particle.

12. The particles of claim 1, wherein the amorphous bi-functional aluminum metallic glass particles comprises $Al_{82}Y_8Ni_7Fe_3$.

13. The particles of claim 1, wherein the amorphous bi-functional aluminum metallic glass particles have a diameter of greater than 500 nm.

14. The particles of claim 1, wherein the amorphous bi-functional aluminum metallic glass particles have a diameter of 0.5-40 μm.

15. Amorphous bi-functional aluminum metallic glass catalyst comprising:
    an aluminum metallic glass core; and
    2 or more transition metals disposed on the surface of the aluminum metallic glass core to form amorphous bi-functional aluminum metallic glass particles with catalytic activity, wherein the aluminum comprises 77% or more of the composition.

16. The catalyst of claim 15, wherein the amorphous bi-functional aluminum metallic glass particles comprises $Al_{82}Y_8Ni_7Fe_3$.

17. The catalyst of claim 15, wherein the aluminum comprises at least 80%, Y comprises at least 5%, Ni comprises at least 4% and Fe comprises at least 1% of the catalyst.

* * * * *